UNITED STATES PATENT OFFICE.

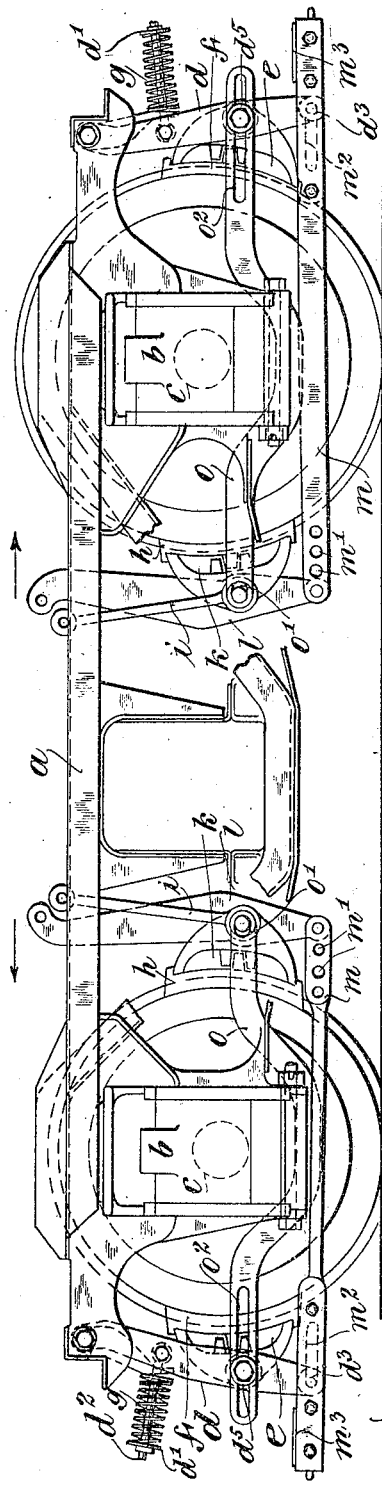

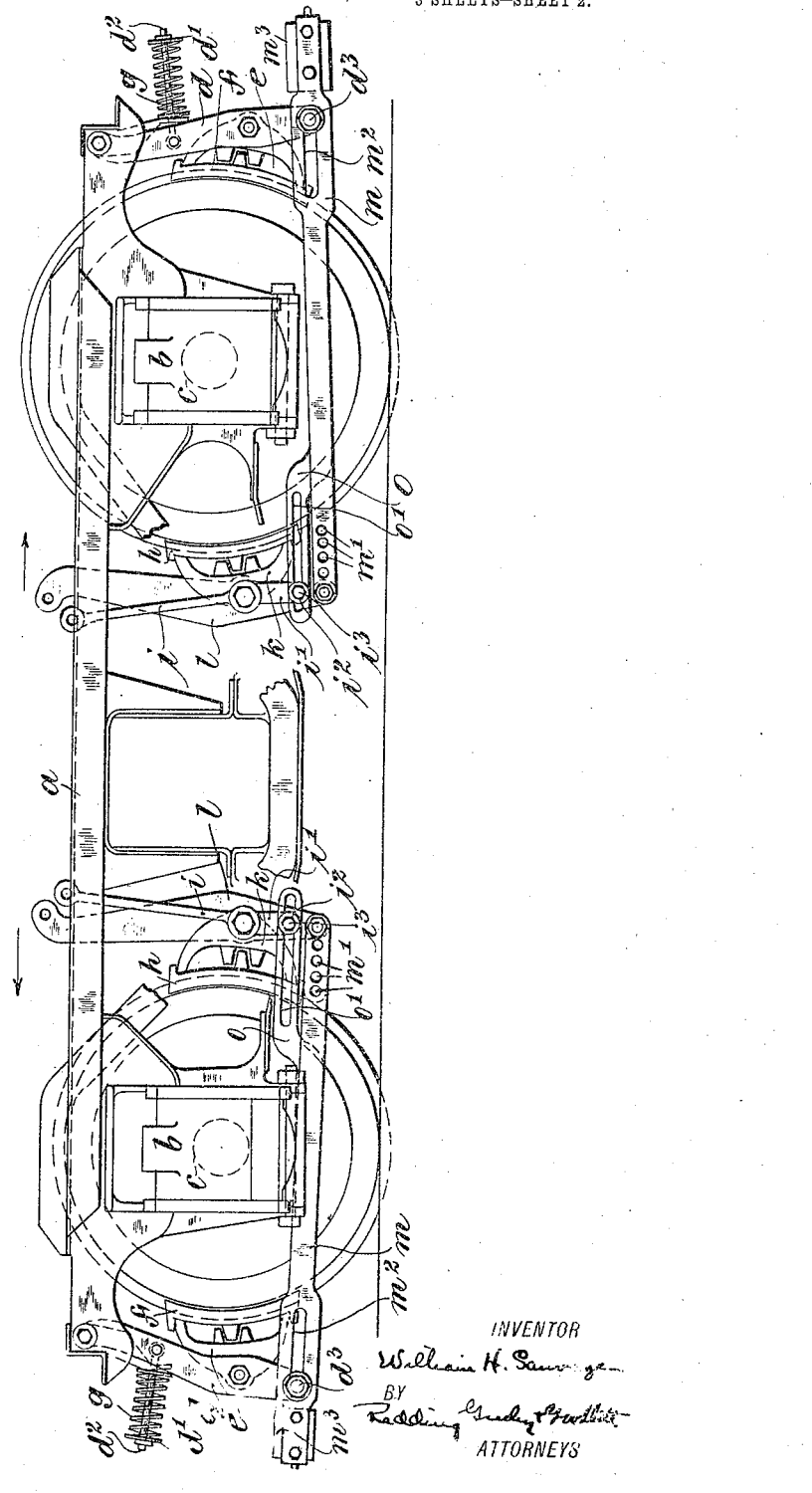

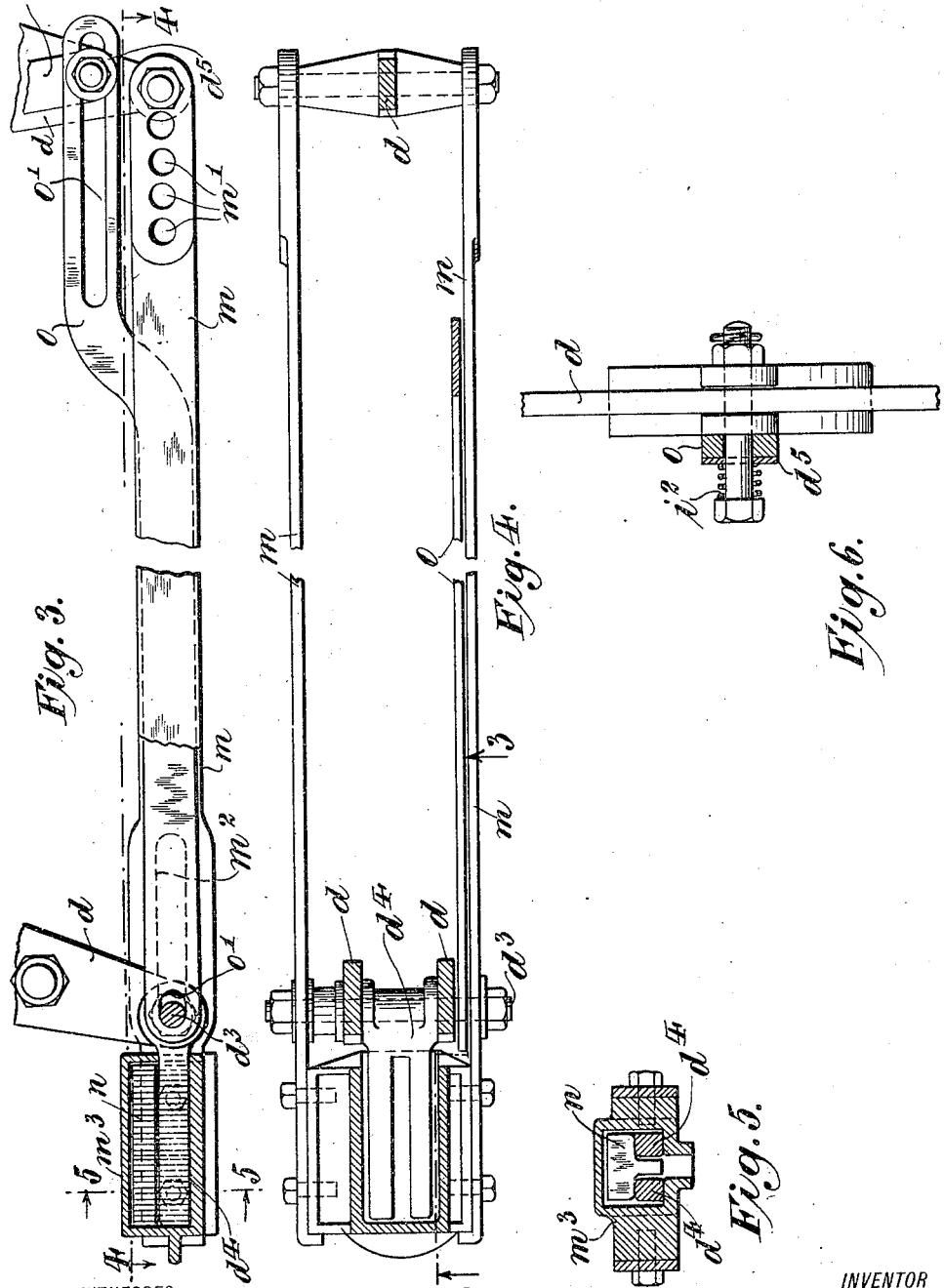

WILLIAM H. SAUVAGE, OF NEW YORK, N. Y.

SLACK-ADJUSTER FOR CLASP-BRAKES.

1,124,813.

Specification of Letters Patent. Patented Jan. 12, 1915.

Application filed May 15, 1914. Serial No. 838,684.

*To all whom it may concern:*

Be it known that I, WILLIAM H. SAUVAGE, a citizen of the United States, and a resident of the borough of Manhattan of the city of New York, in the State of New York, have invented certain new and useful Improvements in Slack-Adjusters for Clasp-Brakes, of which the following is a specification, reference being had to the accompanying drawings, forming a part hereof.

This invention relates to slack adjusters for brake systems in which are employed brakes of the clasp type, in which each wheel is provided with two oppositely acting brakes disposed at different points on its periphery.

The invention has for its object to improve generally brake systems of the character referred to and particularly to provide such a brake system with automatic slack take-up devices which shall be comparatively simple in construction, efficient in operation and readily adjustable either automatically or manually to suit varying conditions of use.

A further object of the invention is to construct a slack adjuster system of the type referred to above in which the usual hangers for one set of brake shoes may be utilized in a dual capacity and function as dead levers. In accordance with such construction the take-up devices may be so mounted with respect to these hangers as to coöperate directly therewith and function from time to time to compensate for the slack occurring in the rigging.

In addition to the improvements indicated above, this invention seeks further to provide in a brake system embodying clasp brakes, adjusting rods interposed operatively between the opposed sets of brake shoes to hold the same in normal spaced relationship under all circumstances, whereby the normal clearance of the shoes is maintained even after the introduction of excessive slack into the rigging as the result of either normal or abnormal conditions.

The invention will be described more particularly with reference to the accompanying drawings, in which—

Figure 1 is a view in side elevation of a car truck equipped with the improved brake system with the adjusting rods connected to the brake shoe heads above the bottom rods. Fig. 2 is a view similar to Fig. 1 but showing the adjusting rods placed somewhat lower. Fig. 3 is an enlarged detail fragmentary view, showing the bottom rod, adjusting rod and shim box of the embodiment of the invention illustrated at the left hand side of Fig. 2, parts being broken out along the broken line 3—3 of Fig. 4. Fig. 4 is a view partly in plan of the parts shown in Fig. 3, the shim box being shown in horizontal section and the shims being omitted in the interest of clearness, the section being taken along the plane indicated by the line 4—4 of Fig. 3. Fig. 5 is a view in section taken on the plane indicated by the line 5—5 of Fig. 3 and looking in the direction of the arrows. Fig. 6 is a detail view on a somewhat enlarged scale of the friction clutch shown in Figs. 2 and 3, the operative parts of the clutch being the same as that shown in Fig. 1.

The brake system is illustrated as applied in accordance with the usual practice, to a diamond truck frame $a$ mounted on the usual axle boxes $b$ through which pass the axles $c$. On opposite ends of the truck frame $a$ are suspended pivotally hangers $d$, intermediate the ends of which are supported the brake beam or brake-shoe heads $e$ for the usual brake shoes $f$. These brake shoes $f$ coöperate with the periphery of the wheel in the usual manner and under influence of applied power, as will hereinafter appear, and are normally maintained in their normal clearance positions with respect to the periphery of the respective wheels by means of coiled springs $g$ which may seat on any convenient fixed portion of the truck frame $a$ and act on washers $d'$ secured to the outer ends of short rods $d^2$ which are fixed to the hangers $d$. With the brake shoes $f$, just described, coöperate respectively other brake shoes $h$ disposed on the opposite sides of the respective wheels and arranged to engage the periphery thereof under the influence of the power, hereinafter referred to, and constitute a clasp brake system of substantially the usual type, in conjunction with the first described set of brake shoes $f$. The brake shoes $h$ are mounted on hangers $i$ which are pivotally supported on any available portion of the truck frame $a$, through the intermediary of the brake beams or brake-shoe heads $k$. On these brake beams $k$ may also be supported the live levers $l$, to the upper ends of which power may be applied from any available external source, such as air cylinders, etc. The lower ends of the live levers $l$ are connected respectively to the hangers $d$ through bottom rods $m$, on one end of each of which may be arranged a series of holes $m'$ to permit initial manual adjustment between the bottom rods and their respective live levers $l$. Each set of opposed brakes acting on each single wheel is in every respect similar to every other set of opposed brakes, so that it will be sufficient for the remainder of this description to refer to only one set of brakes, that is to say, the terms may be employed in the singular but will be understood to apply as well to corresponding elements on every other wheel. If desired, it will be understood, a single source of power may be connected operatively to all of the live levers but in this description it will be sufficient to consider the application of the power to the upper end of only one live lever.

The free end of the bottom rod $m$ is slotted, as at $m^2$, and in this slot rides a pin $d^3$ carried on the lower end of the hanger $d$. On the same pin $d^3$ may be carried a bifurcated push rod $d^4$ which may coöperate with a series of shims $n$ (shown in Fig. 3) disposed operatively in a shim box or frame $m^3$ carried on or formed integral with the free end of the bottom rod $m$. From this description it will appear that when, for reasons to be hereinafter pointed out, the pin $d^3$ moves to the right, as viewed in the figures at the left hand end, along the slot $m^2$, thus carrying with it the push rod $d^4$, one or more shims $n$ will be permitted to drop into place at the end of the push rod $d^4$ and thus shift periodically the solid abutment therefor and compensate automatically for the movement of the push rod in the shim box $m^3$. The movement of the pin $d^3$ along the slot $m^2$ is brought about by means now to be described. These means consist generally in an adjusting rod $o$ in free slotted connection at one end, as at $o^h$, with the brake beam $k$ and in slotted frictional engagement through a spring-pressed washer $d^5$ with the hanger $d$. The washer $d^5$ is supported on a stud which rests slidably in a slot $o^2$ formed in the adjacent end of the adjusting rod $o$. In operation the slot $o'$ permits sufficient relative movement between the adjusting rod and the brake beam $k$ of the brake shoes $h$ to allow the brakes to resume their normal clearance position with respect to the wheel when the power is released, even though the friction clutch $d^5$ engages the adjusting rod $o$ with sufficient stress to prevent relative movement between the adjusting rod and the brake shoes $f$ or hanger $d$. During the travel of the brake shoes to such normal clearance position, there is no relative movement between the bottom rod $m$ and the hanger $d$ and hence no movement of the pin $d^3$ and push rod $d^4$ in the frame $m^3$. During the normal application of the brakes the upper end of the live lever $l$ is moved to the left, as viewed in Fig. 3, swinging the brake shoes $h$ against the wheel and moving the bottom rod $m$ to the right. This movement of the bottom rod is transmitted through the frame $m^3$, push rod $d^4$ and pin $d^3$ to the hanger $d$, thus swinging the lower end of the latter to the right and moving the brake shoe $f$ into engagement with the periphery of the wheel, against the action of the spring $d^2$. When the brakes are released the spring $d^2$ serves to restore the shoes to their normal position, such release movement, as explained before, being permitted by the slot $o'$. In case of excess travel of the upper end of the live lever during application of the brakes, by reason of slack in the system, the friction clutch $d^5$ will be moved along the slot $o^2$ with respect to the adjusting rod $o$, the function of the adjusting rod being primarily to hold the brake shoes $f$ and $h$ in such spaced relationship as to insure normal clearance thereof with respect to the wheel. When the brakes are released after such excess travel of the live lever, the parts will tend to resume their usual positions and this return movement, by reason of the slack in the system, will result in the bottom rod $m$ moving an abnormal distance and consequently moving with respect to the pin $d^3$ and push rod $d^4$. As previously explained, when such relative movement occurs between the last named parts, one or more shims, depending upon the amount of the slack, will drop into the shim box $m^3$ to positions behind the end of the bifurcated push rod $d^4$, thus constituting an adjustable solid abutment therefor and compensating for the slack in the system.

In addition to the generally improved system described above, it is to be noted particularly that the invention contemplates the employment of the hanger $d$ in a dual capacity in that it not only supports the brake shoes $f$ and kindred parts of the brake rigging, but in addition constitutes a dead lever for the entire system and has its upper fixed end as its fixed fulcrum during the application of the brakes. Moreover, the hanger $d$ is arranged to coöperate with the slack take-up devices, found in the shims $n$, in such a way as to permit the slack to be taken up constantly.

The embodiment of the invention illustrated in Figs. 2 and 3 is substantially identical with that illustrated in Fig. 1 save that, in this form, the adjusting rod $o$ is connected to the hanger $d$ through the pin $d^3$ to which the bottom rod $m$ is secured. In this embodiment the hanger $i$ is of novel construction in that it is provided with a downwardly extending arm, projecting below the point of union between the hanger $i$ and the brake beam $k$. The lower arm $i'$ carries at its end a spring clutch $i^2$ which is supported on a stud $i^3$ adapted to slide along a slot $o'$ formed in the end of the adjusting rod $o$.

In the operation of the system illustrated in Figs. 2 and 3 the parts function in substantially the same manner as in the embodiment illustrated in Fig. 1 except that excess travel of the upper end of the live lever $l$, by reason of slack in the rigging, is transmitted directly to the bottom rod $m$ through the adjusting rod $o$ and pin $d^3$, thus bringing about a shifting of the bottom rod $m$ with respect to the pin $d^3$ and resulting movement of the push rod $d^4$ whereby the shims $n$ within the shim box $m^3$ are permitted to drop down and change the abutment for said push rod to compensate for such slack. As before, the friction clutch $i^2$ coöperates with the adjusting rod $o$ to maintain the brake shoes $f$ and $h$ in spaced relationship. In this form of the invention all of the advantages pointed out with respect to the form shown in Fig. 1 are realized in that the brake system is improved generally, is rendered comparatively simple in construction, is efficient in operation and readily adjustable to meet varying conditions of use. Moreover, the hanger $d$ is utilized in this form as a support for part of the brake rigging and also as a dead lever about which the brake system may move.

Modifications in construction will suggest themselves to those skilled in the art, but all such modifications are to be deemed within the scope of this invention so long as they are concerned with improvements in slack adjuster systems for clasp brakes and fall within the scope and spirit of the appended claim.

I claim as my invention:

In a brake system, the combination of clasp brake shoes to co-act at different points with the tread of the wheel, a live lever to control the movement thereof, a dead lever to support one of the brake shoes, slack adjusting means supported by the brake rigging and including a frame having slots therein, a pin carried by the dead lever and disposed movably in said slots, a slide secured to said pin and adapted to engage operatively a portion of said frame to move the brake shoes, and shims mounted in the frame and arranged to shift successively to fill the space between the end of the slide and the frame as slack is taken up.

This specification signed and witnessed this 9th day of May A. D. 1914.

WILLIAM H. SAUVAGE.

Signed in the presence of—
ELLA J. KRUGER,
WORTHINGTON CAMPBELL.